(12) United States Patent
Shi (10) Patent No.: US 11,992,742 B1
(45) Date of Patent: May 28, 2024

(54) ELECTRIC BICYCLE AVAILABLE FOR FITNESS AND INTERACTIVE SYSTEM

(71) Applicant: Suoluowei (Beijing) Technology Development Co., Ltd., Beijing (CN)

(72) Inventor: Chongyang Shi, Beijing (CN)

(73) Assignee: SUOLUOWEI (BEIJING) TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 17/907,889

(22) PCT Filed: Aug. 12, 2021

(86) PCT No.: PCT/CN2021/112165
§ 371 (c)(1),
(2) Date: Aug. 29, 2022

(87) PCT Pub. No.: WO2022/247022
PCT Pub. Date: Dec. 1, 2022

(30) Foreign Application Priority Data

May 27, 2021 (CN) ......................... 202110583866.X
May 27, 2021 (CN) ......................... 202121165303.0

(51) Int. Cl.
*A63B 69/16* (2006.01)
*A63B 21/005* (2006.01)
*A63B 24/00* (2006.01)

(52) U.S. Cl.
CPC .......... *A63B 69/16* (2013.01); *A63B 21/0058* (2013.01); *A63B 24/0087* (2013.01); *A63B 2069/163* (2013.01)

(58) Field of Classification Search
CPC . A63B 21/0058; A63B 24/0087; A63B 69/16; A63B 2069/161; A63B 2069/162;
(Continued)

(56) References Cited

U.S. PATENT DOCUMENTS 6,126,571 A * 10/2000 Parks ...................... A63B 69/16
482/4
6,530,864 B1 * 3/2003 Parks ...................... A63B 69/16
482/61

(Continued)

*Primary Examiner* — Joshua Lee
(74) *Attorney, Agent, or Firm* — Chun-Ming Shih; LANWAY IPR SERVICES (57) ABSTRACT

The present disclosure provides an electric bicycle available for fitness and an interactive system, relates to the technical field of fitness equipment, and solves the technical issue in the prior art that when the electric bicycle is used as fitness equipment, an external damper needs to be added to achieve the purpose of fitness. The electric bicycle available for fitness and the interactive system comprises an electric bicycle body, a front wheel bracket, a rear wheel bracket and a first controller; a front wheel of the electric bicycle body is fixed on the front wheel bracket, the front wheel bracket is provided with a steering and aligning structure, after the front wheel bracket deviates from a designated position, the steering and aligning structure is capable of exerting an acting force so that the front wheel bracket returns to the designated position; a driving motor of the electric bicycle body is electrically connected with the first controller, and the first controller is capable of controlling the driving motor to output reverse torque when the electric bicycle body is used for fitness. The present disclosure provides an electric bicycle available for fitness which uses the driving motor of the electric bicycle to provide reverse torque and an interactive system.

10 Claims, 4 Drawing Sheets

(58) Field of Classification Search
CPC ........ A63B 2069/163; A63B 2069/164; A63B 2069/165
See application file for complete search history.

(56) References Cited

U.S. PATENT DOCUMENTS

| | | | | |
|---|---|---|---|---|
| 7,226,395 B2* | 6/2007 | Wu | ........................ | A63B 69/16 482/61 |
| 7,303,510 B2* | 12/2007 | Gebhardt | ............... | A63B 69/16 482/61 |
| 7,695,406 B2* | 4/2010 | Waters | ................... | A63F 13/22 482/8 |
| 7,766,798 B2* | 8/2010 | Hamilton | ........... | A63B 24/0087 482/61 |
| 7,955,228 B2* | 6/2011 | Hamilton | ........... | A63B 24/0087 482/61 |
| 8,313,419 B2* | 11/2012 | Hamilton | ......... | A63B 21/00192 482/61 |
| 8,435,161 B2* | 5/2013 | Xu | ........................ | A63B 69/16 482/61 |
| 8,439,808 B2* | 5/2013 | Hamilton | ............... | A63B 69/16 482/61 |
| 9,149,702 B2* | 10/2015 | Hamilton | ................ | A63B 69/16 |
| 9,802,099 B2* | 10/2017 | Hamilton | ........... | A63B 24/0087 |
| 10,434,394 B2* | 10/2019 | Bass | ................... | A63B 22/0023 |
| 10,617,913 B2* | 4/2020 | Dhawan | .................. | B62M 6/45 |
| 10,974,118 B2* | 4/2021 | Bass | ................... | A63B 22/0605 |
| 11,383,127 B1* | 7/2022 | Houchin-Miller | ........................... | A63B 22/0605 |
| 11,400,339 B2* | 8/2022 | Bass | ................... | A63B 26/003 |
| 2002/0055422 A1* | 5/2002 | Airmet | .................. | A63F 13/245 482/61 |
| 2004/0053751 A1* | 3/2004 | Pizolato | .................. | A63B 26/003 482/61 |
| 2006/0229163 A1* | 10/2006 | Waters | .................... | A63F 13/22 482/8 |
| 2007/0004565 A1* | 1/2007 | Gebhardt | ............... | A63B 69/16 482/61 |
| 2007/0010377 A1* | 1/2007 | Wu | ........................ | A63B 69/16 482/61 |
| 2010/0062909 A1* | 3/2010 | Hamilton | ........... | A63B 24/0087 482/61 |
| 2012/0178592 A1* | 7/2012 | Chieh | ................ | A63B 22/0605 482/57 |
| 2017/0072254 A1* | 3/2017 | Ryu | ................ | A63G 31/16 |
| 2019/0070476 A1* | 3/2019 | Bass | ................... | A63B 21/005 |
| 2019/0118058 A1* | 4/2019 | Bass | ................... | A63B 21/005 |

* cited by examiner

ELECTRIC BICYCLE AVAILABLE FOR FITNESS AND INTERACTIVE SYSTEM

TECHNICAL FIELD

The present disclosure relates to the technical field of fitness equipment, in particular to an electric bicycle available for fitness and an interactive system.

BACKGROUND

The existing electric bicycles are generally only used for traveling, but is not available for fitness.

If the existing electric bicycle is used indoors as sports equipment, a special bracket is required. Such bracket needs to add extra resistance outside the wheel, or remove the rear wheel and directly connect a resistance device to a bicycle chain, so that the user cannot miss his/her step, thus achieving the fitness effect.

However, both methods have disadvantages.

If a resistance wheel is added to the outside of a tire, it is necessary to squeeze the rear tire with the resistance wheel, resulting in tire deformation, loud noise and tire wear during movement.

If the rear wheel is removed and the resistance wheel is directly connected with the chain, the disassembly process is more complicated.

The applicant finds that there are at least the following technical issues in the prior art: when the existing electric bicycle is used as fitness equipment, an external damper needs to be added.

SUMMARY

The present disclosure aims to provide an electric bicycle available for fitness and an interactive system, so as to solve the technical issue in the prior art hat when the electric bicycle is used as fitness equipment, an external damper needs to be added to achieve the purpose of fitness. Many technical effects that can be produced by the preferred technical solution among the technical solutions provided by the present disclosure are described in detail hereinafter.

In order to achieve the above purpose, the present disclosure provides the following technical solutions.

The electric bicycle available for fitness provided by the present disclosure comprises an electric bicycle body, a front wheel bracket, a rear wheel bracket and a first controller; wherein the rear wheel bracket supports the electric bicycle body and makes a rear wheel of the electric bicycle body in a suspended state;

a front wheel of the electric bicycle body is fixed on the front wheel bracket, the front wheel bracket is provided with a steering and aligning structure, after the front wheel bracket deviates from a designated position, the steering and aligning structure is capable of exerting an acting force so that the front wheel bracket returns to the designated position;

a driving motor of the electric bicycle body is electrically connected with the first controller, and the first controller is capable of controlling the driving motor of the electric bicycle body to output reverse torque when the electric bicycle body is used for fitness.

Preferably, the rear wheel bracket is provided with a color-changing LED lamp and a sound box.

Preferably, rear wheel bracket is provided with a first socket and a second socket, and the first socket and the second socket are connected with both ends of a rear axle of the electric bicycle body, respectively.

Preferably, both the first socket and the second socket are screwed with the rear wheel bracket, and by rotating the first socket and the second socket, the rear axle of the electric bicycle body is capable of being supported between the first socket and the second socket.

Preferably, the rear wheel bracket is connected with the electric bicycle body in a wired or wireless way.

Preferably, the steering and aligning structure comprises a groove upper plate and a groove lower plate, balls and springs are provided between the groove upper plate and the groove lower plate, both ends of the springs are connected with the groove upper plate and the groove lower plate, respectively, the groove upper plate and the groove lower plate are rotatably connected by the balls, and when the groove upper plate rotates with respect to the groove lower plate, the acting force of the springs resets the groove upper plate.

Preferably, the electric bicycle available for fitness further comprises a second controller and an instrument device, the instrument device is connected with the first controller and the second controller, respectively, and the second controller is electrically connected with the front wheel bracket, the rear wheel bracket and the first controller.

Preferably, position detectors are provided on the groove upper plate and the groove lower plate, and the position detectors are connected with the second controller.

Preferably, both the second controller and the instrument device are provided on a handlebar, and the second controller is provided with an acceleration sensor and a magnetic sensor.

An interactive system is provided, comprising a computer, a display device, and the electric bicycle available for fitness according to claim 7; wherein the electric bicycle available for fitness comprises:
a second controller, which is provided on an electric bicycle body;
a position detector, which is provided on a front wheel bracket and is configured to acquire the rotation direction and angle information of a handlebar of the electric bicycle body and feed the information back to the second controller;
a first controller, which is provided on the electric bicycle body and is configured to control a driving motor of the electric bicycle body, obtain the vehicle speed and acceleration information of the electric bicycle body, and feed the information back to the second controller;
an instrument device, which is configured to display the battery power, vehicle speed and acceleration information of the electric bicycle body;
the computer is connected with the second controller, and controls the game operation displayed by the display device according to the motion state of the electric bicycle available for fitness acquired by the second controller.

The beneficial effect of the present disclosure is as follows. The present disclosure provides an electric bicycle available for fitness and an interactive system. The rear wheel bracket is provided, so that the rear wheel is placed in a suspended state. The first controller is provided, so that the first controller can control the driving motor of the electric bicycle to provide reverse torque. When a user is in a fitness state, the driving motor can provide resistance. When stepping forward, the user can feel the resistance that the driving motor outputs to a pedal through a chain and a transmission mechanism, so that the user cannot miss his/her step. Therefore, the electric bicycle can be directly used as fitness equipment, and no additional resistance devices or resistance wheels on the outside of the tire are required, which is convenient and quick. In addition, a front wheel bracket is provided on the front wheel, and the front wheel bracket is provided with a steering and aligning structure. During fitness, the front wheel can complete steering according to the requirements of the user, and can automatically align without external force, thus improving the user experience.

BRIEF DESCRIPTION OF THE DRAWINGS

In order to explain the embodiments of the present disclosure or the technical solutions in the prior art more clearly, the drawings that need to be used in the description of the embodiments or the prior art will be briefly introduced hereinafter. Obviously, the drawings in the following description are only some embodiments of the present disclosure. For those skilled in the art, other drawings can be obtained according to these drawings without creative labor.

In the figures, 1. Front wheel bracket; 2. Vehicle body; 3. Rear wheel bracket; 4. Steering and aligning structure; 5. First controller; 6. Instrument device; 7. Second controller; 41. Groove upper plate; 42. Ball; 4. Spring; 44. Groove lower plate.

DETAILED DESCRIPTION OF THE EMBODIMENTS

The content of the present disclosure and the differences between the present disclosure and the prior art can be understood by referring to FIGS. 1-4 and the text of the drawings. The technical solution of the present disclosure (including the preferred technical solution) will be further described in detail by the following drawings and by listing some alternative embodiments of the present disclosure. It should be noted that any technical features and any technical solutions in this embodiment are one or more of various alternative technical features or alternative technical solutions. For the sake of concise description, the present disclosure cannot list all the alternative technical features and alternative technical solutions of the present disclosure exhaustively, and it is not convenient for the embodiment of each technical feature to be emphasized as one of various alternative embodiments. Therefore, those skilled in the art should know that any technical means provided by the present disclosure can be replaced or any two or more technical means or technical features provided by the present disclosure can be combined with each other to obtain a new technical solution. Any technical features and any technical solutions in this embodiment do not limit the scope of protection of the present disclosure. The scope of protection of the present disclosure should include any alternative technical solutions conceivable to those skilled in the art without creative labor, and new technical solutions obtained by combining any two or more technical means or technical features provided by the present disclosure by those skilled in the art.

In the description of the present disclosure, it should be noted that unless otherwise stated, "a plurality of" means two or more; the directional or positional relationships indicated by the terms "upper", "lower", "left", "right", "inside", "outside", "front", "back", "head" and "tail" are based on the directional or positional relationships shown in the drawings. This is only for the convenience of describing the present disclosure and simplifying the description, rather than indicate or imply that the referred devices or elements must have a specific orientation and be constructed and operated in a specific orientation, so that it cannot be understood as a limitation of the present disclosure. In addition, the terms "first", "second" and "third" are only used for the purpose of description, and cannot be understood as indicating or implying relative importance.

In the description of the present disclosure, it should also be noted that unless otherwise specified and limited, the terms "install", "link" and "connect" should be understood broadly. For example, it may be fixed connection, detachable connection or integral connection; it may be mechanical connection or electrical connection; it may be direct connection or indirect connection through an intermediate medium. For those skilled in the art, the specific meanings of the above terms in the present disclosure can be understood according to specific situations.

The present disclosure provides an electric bicycle available for fitness which uses the driving motor of the electric bicycle to provide reverse torque without adding a damper and an interactive system.

The technical solution provided by the present disclosure will be described in more detail with reference to FIGS. 1-4.

The present disclosure provides an electric bicycle available for fitness, comprising an electric bicycle body, a front wheel bracket, a rear wheel bracket and a first controller; wherein
the rear wheel bracket supports the electric bicycle body and makes a rear wheel of the electric bicycle body in a suspended state;
a front wheel of the electric bicycle body is fixed on the front wheel bracket, the front wheel bracket is provided with a steering and aligning structure, after the front wheel bracket deviates from a designated position, the steering and aligning structure is capable of exerting an acting force so that the front wheel bracket returns to the designated position;
a driving motor of the electric bicycle body is electrically connected with the first controller, and the first controller is capable of controlling the driving motor of the electric bicycle body to output reverse torque when the electric bicycle body is used for fitness.

The present disclosure provides an electric bicycle available for fitness and an interactive system. The rear wheel bracket is provided, so that the rear wheel is placed in a suspended state. The first controller is provided, so that the first controller can control the driving motor of the electric bicycle to provide reverse torque. When a user is in a fitness state, the driving motor can provide resistance. When stepping forward, the user can feel the resistance that the driving motor outputs to a pedal through a chain and a transmission mechanism, so that the user cannot miss his/her step. Therefore, the electric bicycle can be directly used as fitness equipment, and no additional resistance devices or resistance wheels on the outside of the tire are required, which is convenient and quick. In addition, a front wheel bracket is provided on the front wheel, and the front wheel bracket is provided with a steering and aligning structure. During fitness, the front wheel can complete steering according to the requirements of the user, and can automatically align without external force, thus improving the user experience.

As an alternative embodiment, the rear wheel bracket is provided with a color-changing LED lamp and a sound box.

The rear wheel bracket is provided with a color-changing LED lamp and a sound box, which provide sound and light for users in the process of fitness, so as to encourage users to complete fitness.

As an alternative embodiment, the rear wheel bracket is provided with a first socket and a second socket, and the first socket and the second socket are connected with both ends of a rear axle of the electric bicycle body, respectively.

As an alternative embodiment, both the first socket and the second socket are screwed with the rear wheel bracket, and by rotating the first socket and the second socket, the rear axle of the electric bicycle body is capable of being supported between the first socket and the second socket.

According to the structure, both ends of the rear axle are fixed by the first socket and the second socket, so that the rear wheel is in a suspended state, the structure is very simple, and the disassembly is convenient.

As an alternative embodiment, the rear wheel bracket is connected with the electric bicycle body in a wired or wireless way. The rear wheel bracket is connected with the battery of the electric bicycle or connected with the rear wheel bracket through an external power supply to supply power to the rear wheel bracket, thus realizing the accompanying movement effect of the color-changing LED lamp and the sound box.

As an alternative embodiment, the steering and aligning structure comprises a groove upper plate and a groove lower plate, balls and springs are provided between the groove upper plate and the groove lower plate, both ends of the springs are connected with the groove upper plate and the groove lower plate, respectively, the groove upper plate and the groove lower plate are rotatably connected by the balls, and when the groove upper plate rotates with respect to the groove lower plate, the acting force of the springs resets the groove upper plate.

The groove upper plate and the groove lower plate are provided with grooves, respectively. The grooves are provided with balls. The groove upper plate and the groove lower plate are rotatably connected with respect to each other by the balls. A spring is provided between the groove upper plate and the groove lower plate. When the groove upper plate and the groove lower plate move with respect to each other, the spring will deform to provide a reverse effect, so that the groove upper plate and the groove lower plate can automatically return to their positions without external force, so as to achieve the aligning purpose.

As an alternative embodiment, the electric bicycle available for fitness further comprises a second controller and an instrument device, the instrument device is connected with the first controller and the second controller, respectively, and the second controller is electrically connected with the front wheel bracket, the rear wheel bracket and the first controller.

The instrument device is configured to display information such as vehicle speed and electric quantity. The second controller is configured to control the transmission of operation instructions. In practice, the second controller can be a handheld device such as a mobile phone, which can achieve the control of the fitness state (including the reverse torque provided by the driving motor, the sound and light accompanying movement of the rear wheel bracket, etc.) through program control. The second controller acquires the information about the vehicle speed, electric quantity, etc. of the instrument device, which can quantify the fitness data and guide the user to adjust the fitness mode.

As an alternative embodiment, position detectors are provided on the groove upper plate and the groove lower plate, and the position detectors are connected with the second controller.

As an alternative embodiment, both the second controller and the instrument device are provided on a handlebar, and the second controller is provided with an acceleration sensor and a magnetic sensor. When the second controller is a mobile phone, APP programs such as a compass of the mobile phone can also directly used to acquire the steering direction of the handlebar.

An interactive system is provided, comprising a computer, a display device, and the electric bicycle available for fitness according to claim 7; wherein
the electric bicycle available for fitness comprises:
a second controller, which is provided on an electric bicycle body;
a position detector, which is provided on a front wheel bracket and is configured to acquire the rotation direction and angle information of a handlebar of the electric bicycle body and feed the information back to the second controller;
a first controller, which is provided on the electric bicycle body and is configured to control a driving motor of the electric bicycle body, obtain the vehicle speed and acceleration information of the electric bicycle body, and feed the information back to the second controller;
an instrument device, which is configured to display the battery power, vehicle speed and acceleration information of the electric bicycle body;
the computer is connected with the second controller, and controls the game operation displayed by the display device according to the motion state of the electric bicycle available for fitness acquired by the second controller.

Embodiment 1

Figure 1:
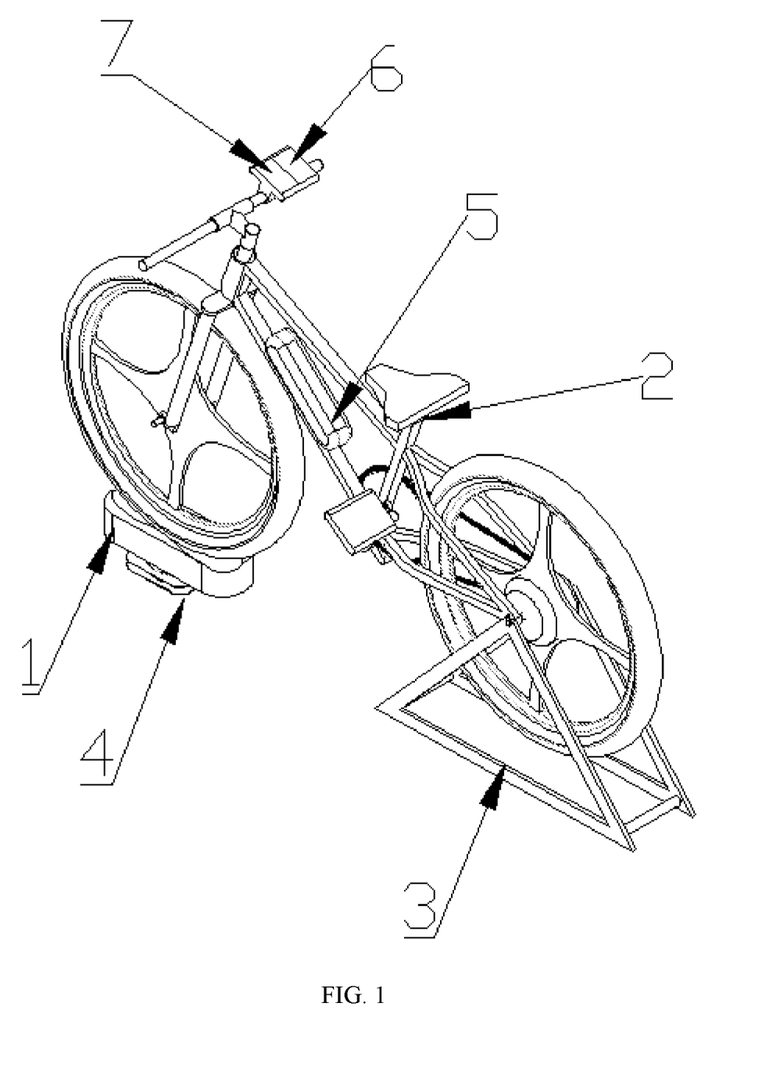
FIG. 1 is a structural schematic diagram of the present disclosure.

The electric bicycle available for fitness provided by the present disclosure comprises an electric bicycle body, a front wheel bracket 1 and a first controller 5.

Figure 3:
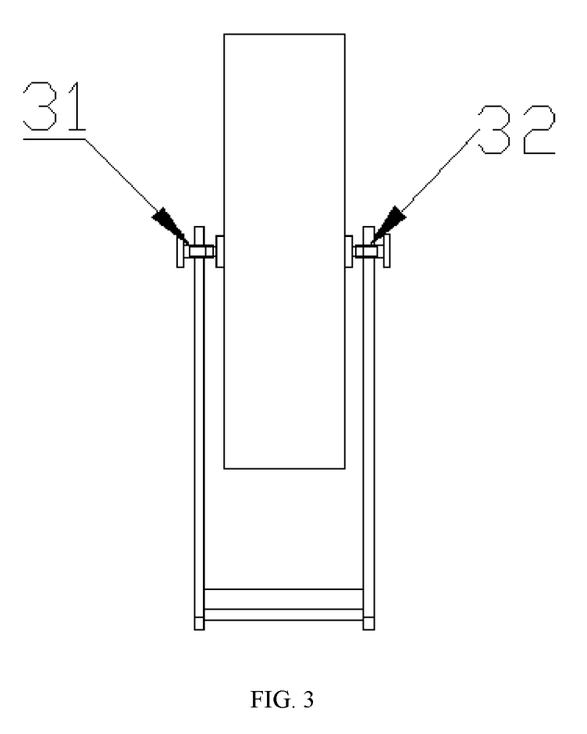
FIG. 3 is a structural schematic diagram of a rear wheel bracket according to the present disclosure.
Figure 4:
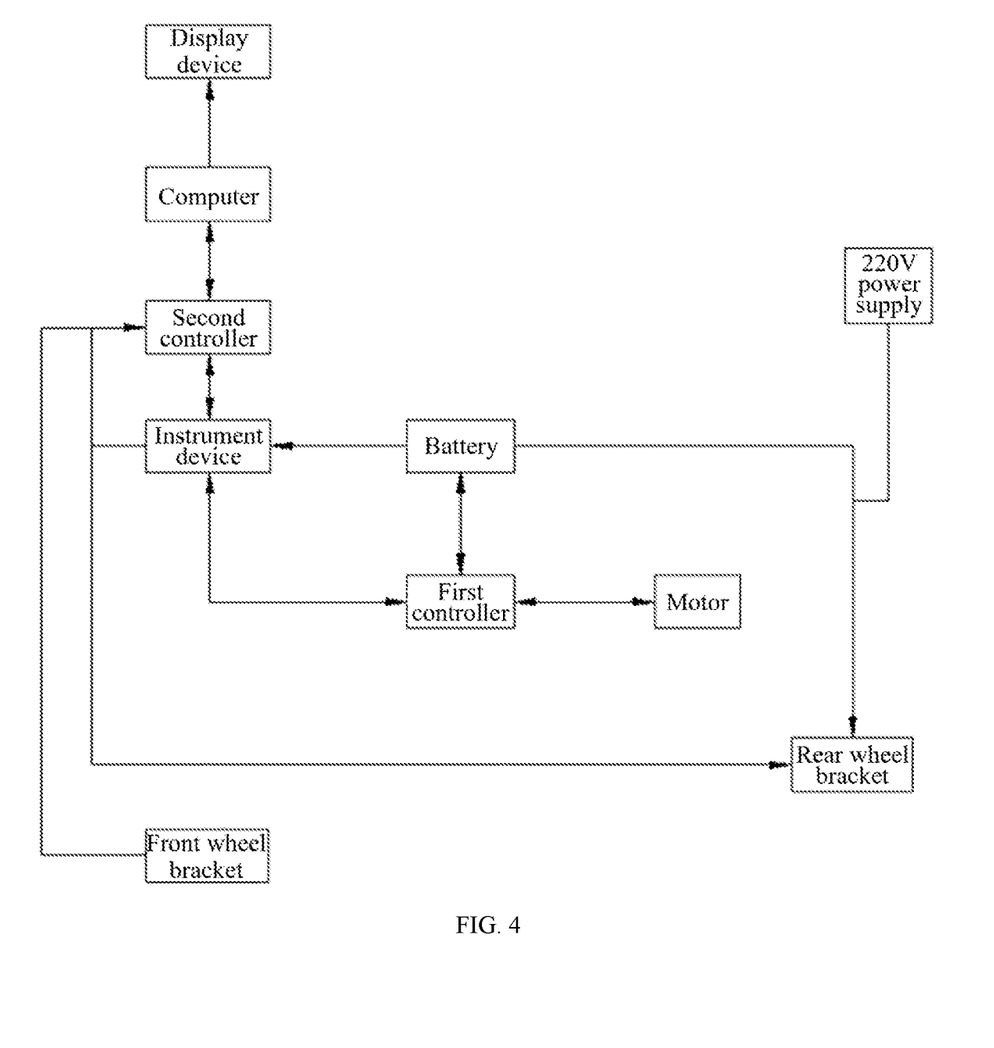
FIG. 4 is a structural schematic diagram of an interactive system according to the present disclosure.

The electric bicycle body comprises a vehicle body 2 and a rear wheel bracket 3. The rear wheel bracket 3 supports the vehicle body 2 and makes the rear wheel in a suspended state, so that the electric bicycle body can be used as indoor fitness equipment.

The rear wheel bracket 3 is provided with a color-changing LED lamp and a sound box. The vehicle body 2 is electrically connected with the rear wheel bracket 3. The battery of the vehicle body 2 is used to charge the rear wheel bracket 3, so as to provide sound and light accompanying movement for users in the process of fitness and encourage users to complete fitness. The rear wheel bracket 3 can also be charged by an external power supply.

The rear wheel bracket 3 is provided with a first socket 31 and a second socket 32. The first socket 31 and a second socket 32 are both screwed with the rear wheel bracket 3. By rotating the first socket 31 and the second socket 32, the rear axle of the electric bicycle body can be supported between the first socket 31 and the second socket 32.

The front wheel of the vehicle body 2 is fixed on the front wheel bracket 1. The front wheel bracket 1 is provided with a steering and aligning structure 4. After the front wheel bracket 1 deviates from a designated position, the steering and aligning structure 4 can exert an acting force so that the front wheel bracket 1 returns to the designated position. The front wheel bracket 1 is provided with a steering and aligning structure 4. When the electric bicycle available for fitness is used for fitness, the handlebar can be rotated, and the handlebar can be automatically aligned without external force, so that the user experience is improved.

Figure 2:
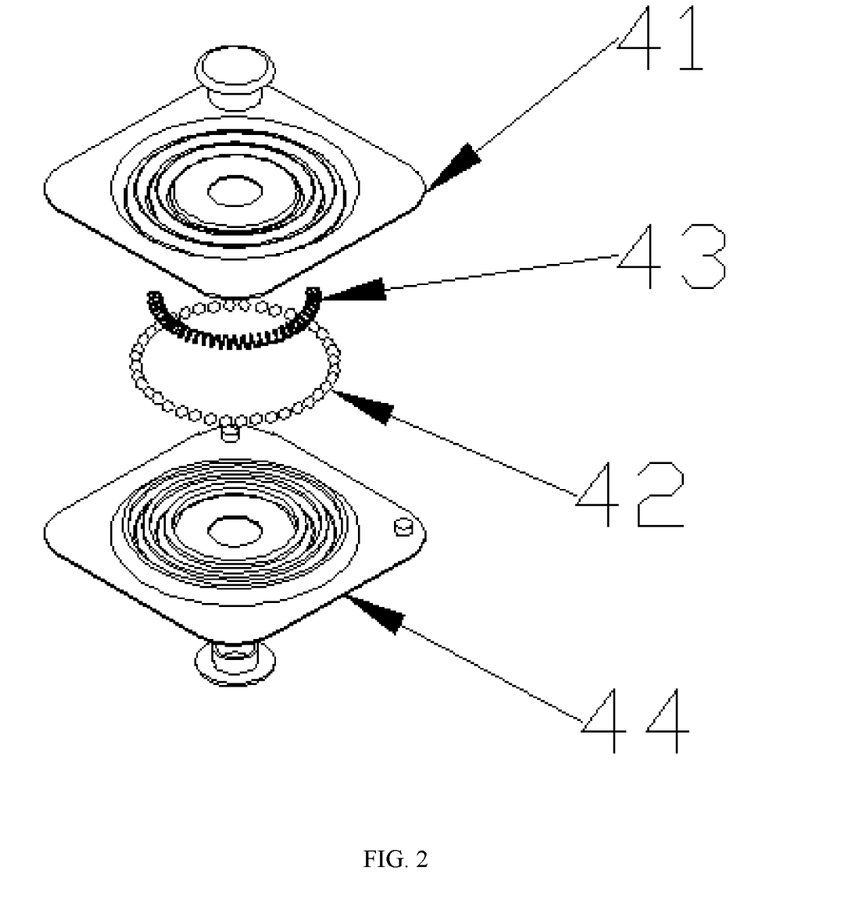
FIG. 2 is a structural schematic diagram of a steering and aligning structure according to the present disclosure.

The steering and aligning structure 4 comprises a groove upper plate 41 and a groove lower plate 44. Balls 42 and springs 43 are provided between the groove upper plate 41 and the groove lower plate 44. Both ends of the springs 43 are connected with the groove upper plate 41 and the groove lower plate 44, respectively. The groove upper plate 41 and the groove lower plate 44 are rotatably connected by the balls 42. When the groove upper plate 41 rotates with respect to the groove lower plate 44, the acting force of the springs 43 resets the groove upper plate 41.

The electric bicycle body is connected with the first controller 5, and the first controller 5 can make the driving motor of the electric bicycle body output reverse torque when the electric bicycle body is used for fitness. The electric bicycle available for fitness can make users feel the resistance provided by the driving motor during fitness without additional resistance devices. In addition, the power output by the human body during fitness can also be converted into electric quantity in the form of energy recovery, which is stored in the battery of the electric bicycle.

Embodiment 2

The difference between Embodiment 2 and Embodiment 1 is that the electric bicycle available for fitness further comprises an instrument device 6 and a second controller 7. Both the second controller 7 and the instrument device 6 are provided on a handlebar of the vehicle body 2. The instrument device 6 is connected with the first controller 5 and the second controller 7, respectively. The second controller 7 is electrically connected with the front wheel bracket 1, the rear wheel bracket 3 and the first controller 5. When the electric bicycle body is locked on the rear wheel bracket 3, the vehicle is already in the state of fitness equipment. The state information is sent to the second controller 7. The second controller 7 is connected with the first controller 5. The first controller 5 controls the driving motor of the electric bicycle body to output reverse torque. Users can feel the resistance output by the driving motor during use, meeting the fitness requirements.

The second controller 7 is connected with the rear wheel bracket 3, and can control the on/off of the color-changing LED light and the sound box on the rear wheel bracket 3. Specifically, the second controller 7 is a mobile phone, which is connected with the rear wheel bracket 3, the first controller 5 and the front wheel bracket 1 through Bluetooth to control the electric bicycle available for fitness.

Position detectors are provided on the groove upper plate 41 and the groove lower plate 44, and the position detectors are connected with the second controller 7. Specifically, taking a linear Hall inductor as an example, when a transmitter magnet and a receiver Hall are installed, the left and right Hall inductors are asymmetrically biased at the position where the front wheel of the vehicle is completely aligned. When the user steers, the steering direction and the steering angle of the user can be judged according to the magnetic field strength signal and the magnetic field change sequence, and the angle information can be fed back to the second controller 7.

An interactive system is provided, comprising a computer, a display device, and the electric bicycle available for fitness described above. The computer is connected with the electric bicycle available for fitness, and controls the game operation displayed by the display device according to the motion state of the electric bicycle available for fitness.

Specifically, the electric bicycle available for fitness comprises:

a second controller, which is provided on an electric bicycle body;

a position detector, which is provided on a front wheel bracket and is configured to acquire the rotation direction and angle information of a handlebar of the electric bicycle body and feed the information back to the second controller;

a first controller, which is provided on the electric bicycle body and is configured to control a driving motor of the electric bicycle body, obtain the vehicle speed and acceleration information of the electric bicycle body, and feed the information back to the second controller;

an instrument device, which is configured to display the battery power, vehicle speed and acceleration information of the electric bicycle body.

The above are only the specific embodiments of the present disclosure, but the scope of protection of the present disclosure is not limited thereto. Any changes or substitutions conceivable to those skilled in the art within the technical scope disclosed by the present disclosure should fall within the scope of protection of the present disclosure. Therefore, the scope of protection of the present disclosure should be subject to the scope of protection of the claims.

What is claimed is:

1. An electric bicycle available for fitness, comprising an electric bicycle body, a front wheel bracket, a rear wheel bracket and a first controller; wherein:

the rear wheel bracket supports the electric bicycle body and makes a rear wheel of the electric bicycle body in a suspended state;

a front wheel of the electric bicycle body is fixed on the front wheel bracket, the front wheel bracket is provided with a steering and aligning structure, after the front wheel bracket deviates from a designated position, the steering and aligning structure is capable of exerting an acting force so that the front wheel bracket returns to the designated position;

a driving motor of the electric bicycle body is electrically connected with the first controller, and the first controller is capable of controlling the driving motor of the electric bicycle body to output reverse torque when the electric bicycle body is used for fitness.

2. The electric bicycle available for fitness according to claim 1, wherein the rear wheel bracket is provided with a first socket and a second socket, and the first socket and the second socket are connected with both ends of a rear axle of the electric bicycle body, respectively.

3. The electric bicycle available for fitness according to claim 2, wherein both the first socket and the second socket are screwed with the rear wheel bracket, and by rotating the first socket and the second socket, the rear axle of the electric bicycle body is capable of being supported between the first socket and the second socket.

4. The electric bicycle available for fitness according to claim 1, wherein the rear wheel bracket is connected with the electric bicycle body in a wired or wireless way.

5. The electric bicycle available for fitness according to claim 1, wherein the steering and aligning structure comprises a groove upper plate and a groove lower plate, balls and springs are provided between the groove upper plate and the groove lower plate, both ends of the springs are connected with the groove upper plate and the groove lower plate, respectively, the groove upper plate and the groove lower plate are rotatably connected by the balls, and when the groove upper plate rotates with respect to the groove lower plate, the acting force of the springs resets the groove upper plate.

6. The electric bicycle available for fitness according to claim 5, wherein the electric bicycle available for fitness further comprises a second controller and an instrument device, the instrument device is connected with the first controller and the second controller, respectively, and the second controller is electrically connected with the front wheel bracket, the rear wheel bracket and the first controller.

7. The electric bicycle available for fitness according to claim 6, wherein position detectors are provided on the groove upper plate and the groove lower plate, and the position detectors are connected with the second controller.

8. The electric bicycle available for fitness according to claim 6, wherein both the second controller and the instrument device are provided on a handlebar, and the second controller is provided with an acceleration sensor and a magnetic sensor.

9. The electric bicycle available for fitness according to claim 1, wherein the rear wheel bracket is provided with a color-changing LED lamp and a sound box.

10. An interactive system, comprising a computer, a display device, and the electric bicycle available for fitness according to claim 7; wherein:
the electric bicycle available for fitness comprises:
the second controller, which is provided on the electric bicycle body;
a position detector, which is provided on a front wheel bracket and is configured to acquire rotation direction and angle information of a handlebar of the electric bicycle body and feed the rotation direction and angle information back to the second controller;
a first controller, which is provided on the electric bicycle body and is configured to control a driving motor of the electric bicycle body, obtain vehicle speed and acceleration information of the electric bicycle body, and feed the vehicle speed and acceleration information back to the second controller; and
the instrument device, which is configured to display battery power, vehicle speed and acceleration information of the electric bicycle body;
the computer is connected with the second controller and controls the game operation displayed by the display device according to a motion state of the electric bicycle available for fitness acquired by the second controller.

* * * * *